US006871582B1

(12) United States Patent
Keipek et al.

(10) Patent No.: US 6,871,582 B1
(45) Date of Patent: Mar. 29, 2005

(54) CONTINUOUS VERTICAL PROCESSOR

(76) Inventors: Thadeus Keipek, Ulderico Franklin da Silva N° 94, Erechim, Estado Rio Grande do Sul (BR); Romaldo Skzypek, Henrique Dias N° 769, Erechim, Estado Rio Grande do Sul (BR); Augusto Ovidio Skrzypek, Soledade N° 443, Erechim, Estado Rio Grande do Sul (BR); Jandir Antonio Cantele, Jose Giacomini N° 42 hab. 61, Erechim, Estado Rio Grande do Sul (BR)

( * ) Notice: Subject to any disclaimer, the term of this patent is extended or adjusted under 35 U.S.C. 154(b) by 0 days.

(21) Appl. No.: 10/787,316

(22) Filed: Feb. 27, 2004

(51) Int. Cl.$^7$ ................................................. A23L 1/00
(52) U.S. Cl. ............................ 99/330; 99/352; 99/516
(58) Field of Search ................... 99/348, 483, 452–455, 99/484–487, 489, 330, 516, 534, 536, 352, 467, 468, 470, 471; 426/231, 511, 506, 507, 454, 455; 366/144, 149, 279; 119/844, 442; 452/63, 129, 125, 68, 106, 69

(56) References Cited

U.S. PATENT DOCUMENTS

| | | | | |
|---|---|---|---|---|
| 4,817,982 A | * | 4/1989 | Kassai | ........................ 280/644 |
| 4,898,092 A | * | 2/1990 | Greer | .......................... 99/487 |
| 4,909,138 A | * | 3/1990 | McAskie | ....................... 99/536 |
| 4,939,988 A | * | 7/1990 | Wyatt et al. | ................... 99/516 |
| 5,133,982 A | * | 7/1992 | Bodkin et al. | ............... 426/231 |
| 5,194,275 A | * | 3/1993 | Greer | .......................... 426/231 |
| 5,363,754 A | * | 11/1994 | Coles et al. | ................... 99/484 |
| 5,442,995 A | * | 8/1995 | Greer | .......................... 99/487 |
| 5,488,898 A | * | 2/1996 | Hough | ......................... 99/516 |
| 5,598,770 A | * | 2/1997 | Campbell et al. | ............. 99/487 |
| 5,637,340 A | * | 6/1997 | Greer | .......................... 426/456 |
| 6,383,544 B1 | * | 5/2002 | Elkins | ......................... 426/511 |
| 6,516,710 B1 | * | 2/2003 | Knight et al. | .................. 99/348 |

* cited by examiner

Primary Examiner—Timothy F. Simone
(74) Attorney, Agent, or Firm—Sughrue Mion, PLLC

(57) ABSTRACT

A continuous vertical processor for meat wastes, from animal slaughter for obtaining industrial fats and meat and bone flours for the manufacture of fodders, including a cylindrical structure (1), with 12 sealed separators (12) in the interior thereof, heated by steam pipes (15) furnished with sluicegates (14), which communicate with each other. Mixing paddles are fixed on the vertical axis (8). On the top portion of the cylindrical structure (1) is a product-input-sluice gate (5) and a chopper (6). On a bottom portion of the cylindrical structure (1) is an output-sluicegate (9) and a tilted cylindrical equalizing vat (10), which is filled with molten hot fat. Inside the vat there is a helicord conveyor (17) and, next to the highest end thereof, there is an output-sluicegate (11) and an exhaust pipe for excess fat (18). Inside each stage there is a gas exhaust pipe (16), for gases collected by the gas-output-pipe (4).

1 Claim, 2 Drawing Sheets

CONTINUOUS VERTICAL PROCESSOR

BACKGROUND OF THE INVENTION

The invention relates to a continuous vertical processor for meat wastes, derived from animal slaughter, for obtaining industrial fats and meat and bone flours, for the manufacture of fodders.

The machines which are currently being used for this purpose are intermittent, one or more units per slaughterhouse being used, depending on the amount to be processed.

BRIEF SUMMARY OF THE INVENTION

The processor of the invention processes the by-products in a continuous manner, with heating being effected by means of saturated steam.

In one aspect, the processor of the invention is made up of sealed stages, wherein the material is continuously entering and passing through a chopper which regularizes the dimensions of the materials, in order to make the cooking homogeneous. Thereafter, the material is stirred, at each stage, by the mixing paddles which also direct the material towards the sluicegates, which open at times pre-established by the micro-processor, and let the material fall due to the effects of gravity, towards the next stage, until the final and bottom stage is reached, from which it falls into the equalizing vat, where it is dipped in hot liquid fat which is then separated and transported by a helicoid conveyor towards an output sluicegate, where it is collected and receives the final processing, that is pressing, grinding and cooling, which produces the mixed meat and bone flours used for manufacturing animal fodders.

BRIEF DESCRIPTION OF THE DRAWINGS

The above and other objects, features and advantages of the invention will become more apparent by describing in detail exemplary embodiments thereof with reference to the attached drawings in which.

DETAILED DESCRIPTION OF EXEMPLARY EMBODIMENTS

Figure 1:
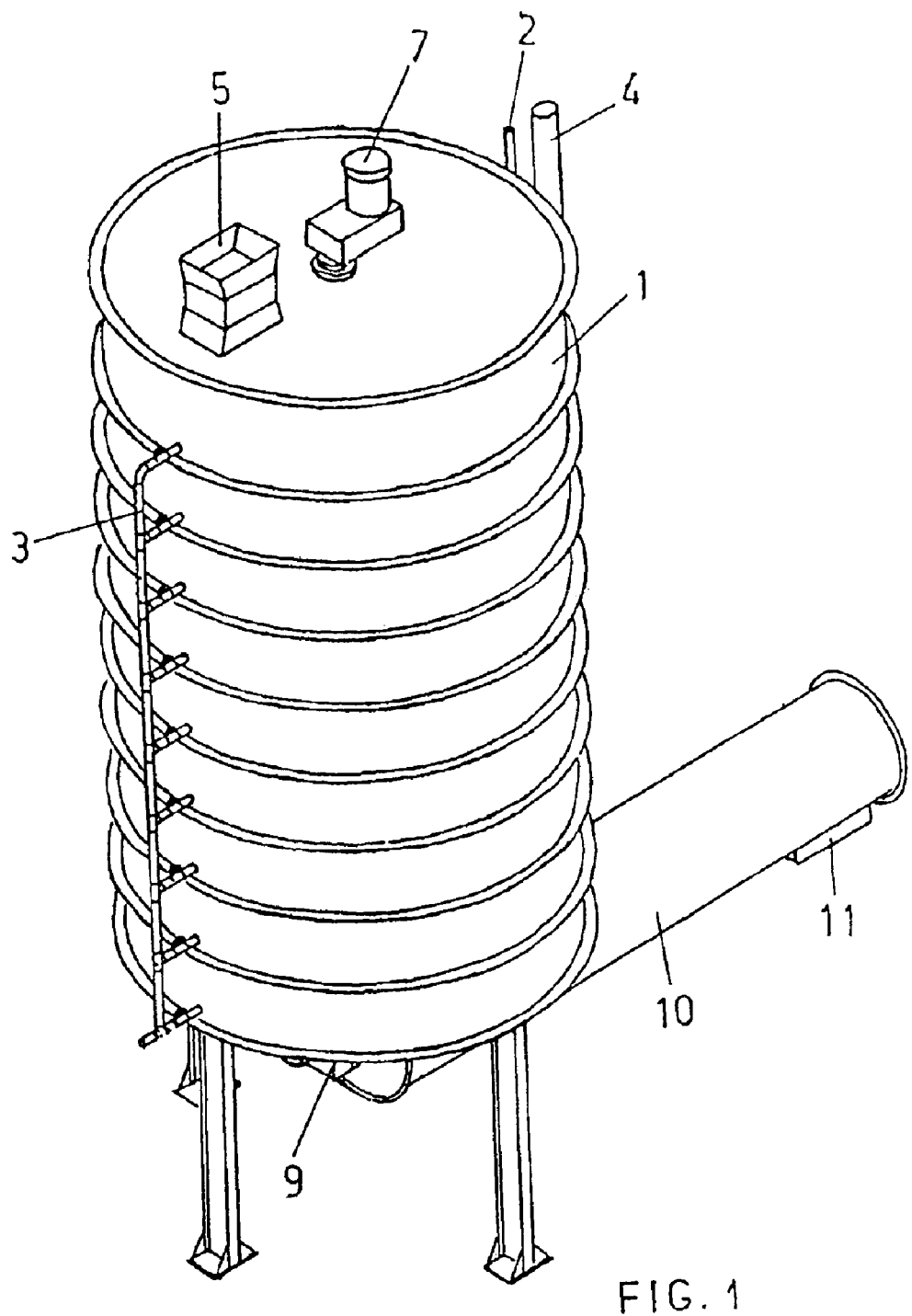
FIG. 1 is a perspective view of an exemplary embodiment of the processor of the invention.
Figure 2:
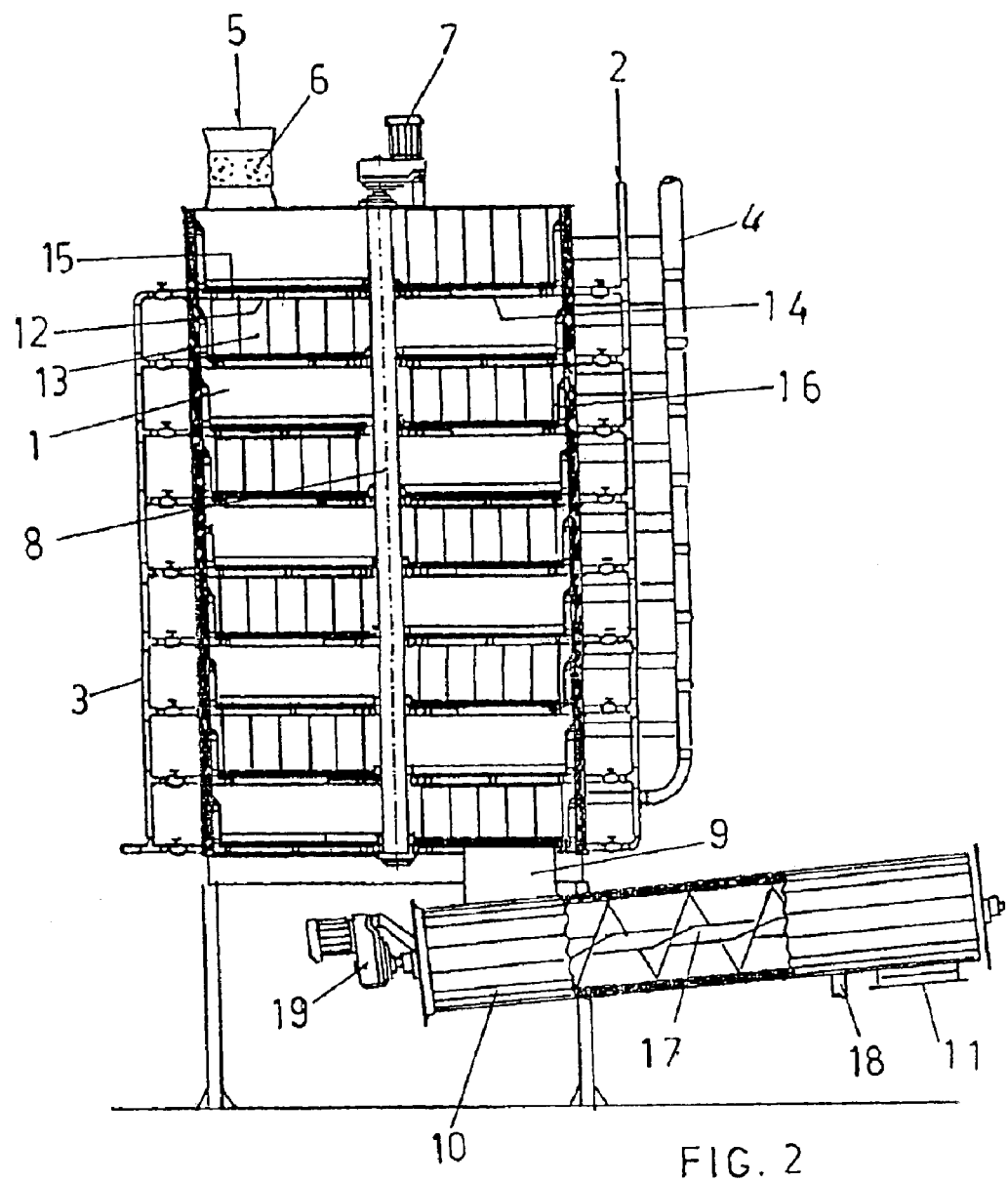
FIG. 2 is a sectional view of the exemplary embodiment of the processor shown in FIG. 1.

Exemplary embodiments of the invention will now be described below by reference to the attached Figures. The described exemplary embodiments are intended to assist the understanding of the invention, and are not intended to limit the scope of the invention in any way. As may be seen in the attached figures, the the processor of the invention includes a basically cylindrical metal structure (1), having, on the outside thereof, steam-input pipes (2), condensate-output pipes (3) and a gas-output pipe (4).

On the top portion thereof there is a product input sluicegate (5) chopper (6) and the motoring (7) of the vertical axis (8) of the mixing paddles.

At the bottom thereof there is an output sluicegate (9), a tilted equalizing cylindrical vat (10) and an output sluicegate (11).

Within the metal structure (1) there are several sealed separators (12), which separate the different processing stages, where the separators are heated by steam pipes (15), connected to the steam input pipes (2) or the condensate output pipes (3). The vertical axis (8) passes between such separators, to which, at diametrically opposite positions, the mixing paddles (13) are fixed. Also, at diametrically opposite positions, are the sluicegates (14), which are hydraulically or pneumatically operated, commanded by an electronic processor which controls the opening time. At each stage there is a gas exhaust pipe (16), which collects the gases and directs them towards the gas-output pipe (4), where they are driven through the anti-pollution treatment unit.

After the material has gone through all the processing stages, it falls through the output sluicegate (9) into the cylindrical equalizing vat (10), with a steam-heated jacket, at the bottom thereof, with molten fat, and in whose interior there is a helicoid conveyor (17), powered by a reduction engine (19) which moves the material towards the output sluicegate (11), where it is collected for further processing. The equalizing vat has an output pipe for excess fat (18), which is collected for latter use.

The material to be processed enters continuously, driven by the conveyor belt or other means, through the product-input sluicegate (5), where there is a chopper (6) which homogenizes the material, which falls to the first stage due to gravity, is heated by steam by means of steam pipes (15) with the others, and is mixed and moved so that all the batter may be homogeneously heated by mixing paddles (13), which may be heated or not. Such paddles are fixed at diametrically opposite positions, from one stage to the other, they rotate powered by the vertical axis (8). At pre-determined times, which vary according to the origin of the material, a command processor opens the sluicegates (14), letting the material fall to the following stage. The mixing paddles (13) carry the material towards the sluicegates opening, making it fall. After the final stage, the material falls in the form of molten fat, to the bottom of the cylindrical equalizing vat (10), where the final processing takes place, being thereafter carried through a helicoid conveyor (17) to the output sluicegate (11).

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the following claims.

What is claimed is:

1. A continuous vertical processor comprising:

a basically cylindrical metal structure within which are sealed separators, heated by steam pipes, connected to steam-input pipes and to steam and condensate output pipes;

a vertical axis passing between said separators, connected to a motoring thereof, and to which mixing paddles are fixed and set at diametrically opposite positions to each other;

a sluicegate at each separator;

a gas exhaust pipe at each separator, connected to a gas-output pipe;

a product-input pipe and a chopper at a top portion of said cylindrical metal structure; and an output sluicegate, and a tilted cylindrical equalizing vat with a heated jacket, at a bottom portion of the cylindrical metal structure, wherein the cylindrical equalizing vat comprises a helicoid conveyor powered by a reduction engine, the vat having, next to the highest portion thereof, an output sluicegate and an output pipe for excess fat.

\* \* \* \* \*